United States Patent [19]

Kim

[11] 4,323,103
[45] Apr. 6, 1982

[54] ANTI-SKID TIRE GUARD

[76] Inventor: Yoobong Kim, 5401 Rubolt Rd., Cincinnati, Ohio 45211

[21] Appl. No.: 174,644

[22] Filed: Aug. 1, 1980

Related U.S. Application Data

[63] Continuation-in-part of Ser. No. 108,498, Dec. 31, 1979, abandoned.

[51] Int. Cl.$^3$ .................. B60C 27/00; B60C 27/20
[52] U.S. Cl. .................. 152/213 A; 24/68 TT;
24/299; 24/374; 81/15.8; 152/222; 152/226;
152/242; 152/244
[58] Field of Search .................. 152/226, 219, 213 R,
152/213 A, 221, 222, 225 R, 214, 227, 228, 244,
216, 217, 233, 241, 242; 24/68 CT, 68 TT, 69
TT, 71 TT, 201 HE, 201 LP, 299, 374; 81/15.8

[56] References Cited

U.S. PATENT DOCUMENTS

| | | | |
|---|---|---|---|
| 938,371 | 10/1909 | Davey | 152/219 |
| 1,072,522 | 9/1913 | Staples | 152/219 X |
| 1,288,005 | 12/1918 | Huml | 152/225 R |
| 1,758,944 | 5/1930 | Grosch | 152/213 R |
| 2,341,317 | 2/1944 | Faulds | 152/228 X |
| 2,363,998 | 11/1944 | Royer | 152/219 X |
| 2,507,037 | 5/1950 | Miller | 152/225 R X |
| 2,639,753 | 5/1953 | Pike | 152/219 X |
| 2,671,489 | 3/1954 | Henderson | 152/229 |
| 2,918,960 | 12/1959 | McGuinness | 152/242 X |
| 3,118,481 | 1/1964 | Braudorn | 152/222 |
| 3,893,499 | 7/1975 | von der Hellen | 152/213 A |
| 3,913,651 | 10/1975 | Stonack | 152/219 X |
| 4,036,273 | 7/1977 | Kemper | 152/225 R |

Primary Examiner—John E. Kittle
Assistant Examiner—Thomas Bokan
Attorney, Agent, or Firm—Bruce H. Bernstein; Neil F. Greenblum; Donald M. Sandler

[57] ABSTRACT

An anti-skid tire guard has three main components. The first component is a pair of spaced strips of material, each of the strips comprising three slats connected end to end by hinge pins. The strips are maintained in spaced relation by a plurality of metal or plastic tread members having studs projecting from one surface thereof. The ends of both of the strips are provided with female connectors. A plurality of blanks comprise each tread member and are connected by wires which are attached to the hinges by adjacent slats forming the strips. The second component comprises two slats attached end to end by a hinge, the free ends of each of these slats comprising male connector members designed to securely fit within the female members. A tread member similar to those used in the first component is provided, which is attached to the hinged portion between the two slats at one end and which has a hook at its other end. The third component comprises three slat members being positioned in end to end relation and forming a strip. The ends of the strip comprise male members adapted to be inserted into the female connectors and two of the slats are hingedly connected so that they can overlie one another when the anti-skid assembly is positioned and tightened about a vehicle tire.

11 Claims, 7 Drawing Figures

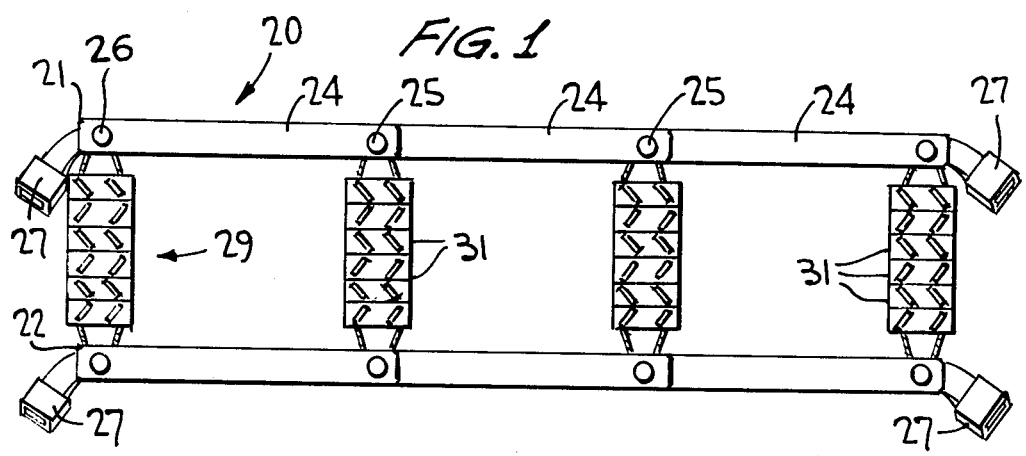
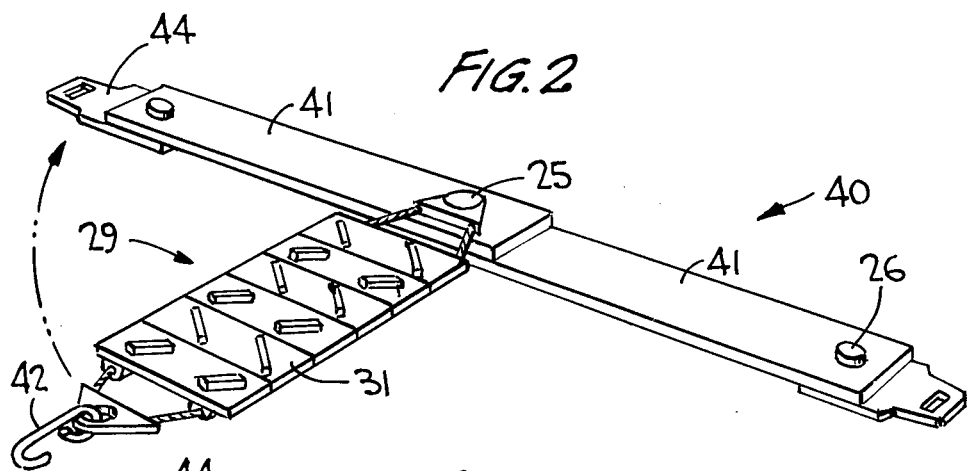
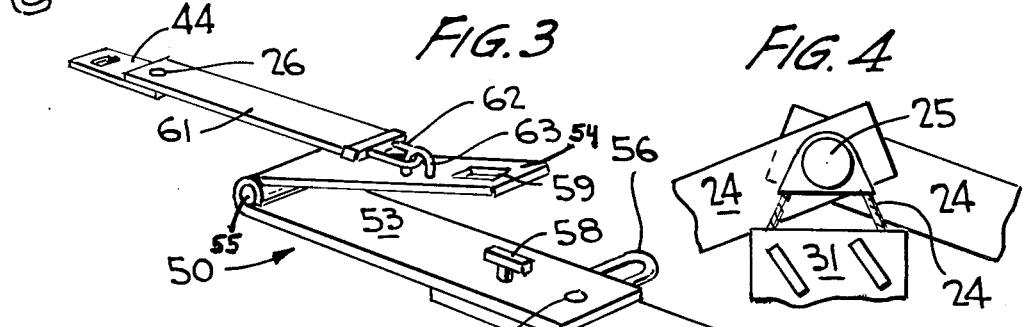
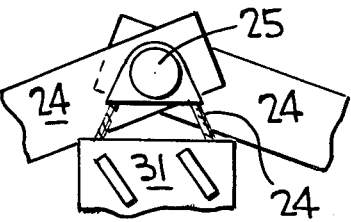
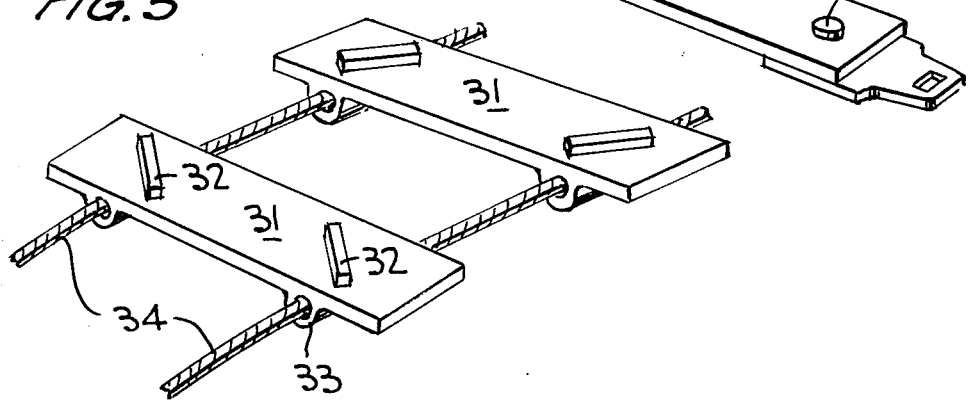

ANTI-SKID TIRE GUARD

This application is a continuation-in-part application of U.S. Application Ser. No. 108,498, filed on Dec. 31, 1979 and now abandoned.

BACKGROUND OF THE DISCLOSURE

Field of the Invention

The present invention generally relates to an anti-skid tire guard and more particularly to an anti-skid tire guard which can provide increased traction for a tire and which is easily removable from and positionable upon the tire.

2. Discusion of the Prior Art

Anti-skid tire guards have been developed which improve the traction of vehicles tires to minimize vehicle skidding during poor weather conditions, e.g. ice, snow or rain. Most conventional anti-skid tire guards must be installed on vehicles when the car is at least partially raised from the ground or support surface. Removal of the guard requires a similar raising of a vehicle. Other prior art emergency tire guards are installable on a temporary basis without raising a vehicle but require an installer to position himself with great difficulty behind the tire resulting in an ackward and dirty installation. Other guards necessitate the use of tools for installation and/or removal.

Additionally, the tire must be in a specified position for installation/mounting and/or demounting of the guards from the tires at a predetermined time.

DAVEY, U.S. Pat. No. 938,371, discloses a detachable tread for vehicle tires comprising an endless band having a plurality of sections of tough flexible material. The sections are connected by a plurality of coiled springs elastically joining the sections at their corners. The device is fitted over a tire by pulling on the springs so as to enlarge the circumference of the device, stretching it over a tire and letting it be constricted by the pulling action of the resilient springs.

STAPLES, U.S. Pat. No. 1,072,522, discloses an anti-skidding gripping device engagable about a resilient motor vehicle tire. The device comprises a plurality of tread engaging chains having a coil spring for connecting the ends of the chain together in secure relation about the tire. One spring is positioned on each side of the tire.

GROSCH, U.S. Pat. No. 1,758,944, discloses a nonskid chain apparatus designed to be attached to a motor vehicle tire. The chain comprises two circumferential sections joined by tread chains and connected across their extremities by U-shaped bands. The bands, when placed about the tire, automatically secure the inner circumferential chain in desired position.

ROYER, U.S. Pat. No. 2,363,998, discloses a tire chain connector which is easily applicable to a vehicle tire. The connector comprises a wrap around chain having side chain, cross chains, and connectors for the side chains. Telescopic latch coupling members are connected to the ends of one of the side chains by safety latch hooks which permit detachment of the members for removal or adjustment of the tire chain assembly.

MILLER, U.S. Pat. No. 2,507,037, discloses a tire chain for covering the entire periphery of a tire. Each tire chain assembly comprises a plurality of arcuate strips concentric with a bead or rim of the tire. The strips are connected by a plurality of flexible members which are rigidly attached to the strip and which snugly embrace a portion of the tire to maintain the assembly thereon. A quickly detachable fastener is secured to a cable which is positioned over a plurality of headed studs.

McGUINNESS, U.S. Pat. No. 2,918,960, discloses an anti-skid tire assembly which comprises a plurality of rods. Each of the rods defines a segment of a vehicle wheel. Hooks and chains can be connected to the rod to serve as tire chains in bad weather conditions.

VON DER HELLEN, U.S. Pat. No. 3,893,499, discloses tire chains having an inside latch unit to eliminate the requirement for a user to reach behind a tire onto which the tire chains are placed. The latch unit comprises a pull cord and a cam lock for releasing otherwise conventional tire chains from the periphery of a vehicle tire.

STONACK, U.S. Pat. No. 3,913,651, discloses an easily installable tire chain assembly which can be draped quickly and conveniently over a vehicle wheel and tire. The vehicle need not be jacked up prior to mounting the assembly and includes paired turnbuckle connecting and takeup assemblies for snugly contacting the tire chains against a vehicle tire.

None of these assemblies, however, provide a simple and easy to assembly multi-piece anti-skid tire guard which is simple to install and which can easily be removed by a user. Additionally, none of these units comprises a spaced tread unit which has a plurality of tread sections uniformly distributed about the periphery of a tire when it is placed on a vehicle tire. Nor does any of these devices allow installation and removal of the device from a tire irrespective of the position that the vehicle wheel assumes.

SUMMARY OF THE INVENTION

Accordingly, it is a general object of the present invention to provide a new and improved anti-skid tire guard for a vehicle.

It is an additional object of the present invention to provide a new and improved anti-skid tire guard for a vehicle tire which can be easily installed without necessitating raising of the vehicle or an installer to go behind a tire.

A further object of the present invention is to provide a new and improved anti-skid tires guard for a vehicle tire which can be easily removed by a user's fingertips.

Still another object of the present invention is to provide a new and improved anti-skid tire guard for a vehicle tire having a plurality of equally spaced tread unit for providing increased traction for a vehicle tire such that the tread sections provide a uniform distribution of tread sections.

Still a further object of the present invention is to provide a new and improved anti-skid tire guard for a vehicle tire having a plurality of mating male and female buckles and clasps so that the guard can be removed from a stopped vehicle irrespective of the particular orientation of a tire, i.e. the guard can be easily removed whether a particular portion of the device is positioned on top, at the bottom, or alongside the tire.

Yet another object of the present invention is to provide a new and improved anti-skid tire guard for a vehicle tire which has a pentagonal shaped configuration for providing a sturdy, simple and effective means of retaining a tire tread assembly on a vehicle tire.

Upon further study of the specification and appended claims, further objects, features and advantages of the present invention will become more fully apparent to those skilled in the art to which this invention pertains.

Briefly, the above and other objects, features and advantages of the present invention are obtained in a first aspect thereof by providing a new and improved anti-skid tire guard for a vehicle tire which is adapted to be quickly mounted upon and demounted from the tire when a vehicle on which the tire is positioned rests on the ground or similar support surface. The guard comprises a first component having two generally parallel, flexible strips spaced apart by a plurality of tread members positioned in a direction generally transverse to the strips. The strips have two ends and connectors attached to the ends. The guard further comprises a second component having a third flexible strip with two ends, the two ends comprising mating connectors which are adapted to be attached to the connectors on one of the parallel strips. The second component also includes a tread member having a first end attached to the third strip and a second end attached to a latching member. The tread member is adapted to extend transversely to the third strip. The guard also includes a third component comprising a latching member having a fourth flexible strip which has a plurality of hinged slats, two mating connectors adapted to be connected to the other one of the parallel strips, means for retaining the second component tread member and means for retaining two of the hinged slats in superposed folded relation. When the first and second components and latching member are attached by connecting the mating connectors, the guard will be securely positioned about the tire by folding the two hinged slats of the latching member into superposed relation.

The above and other objects, features and advantages of the present invention are obtained in a second aspect thereof by providing an anti-skid guard for a vehicle tire which is adapted to be quickly mounted upon and demounted from the tire when the vehicle upon which the tire is place is positioned on the ground or similar support surface. The guard comprises a first component having two generally parallel flexible strips spaced apart by a plurality of tread members positioned in a direction generally transverse to the strips. Each of the tread members comprises a plurality of attached tread blanks having rectangular studs extending from their outer surface. Each tread member comprises a plurality of these blanks attached together by at least one wire or cable which is attached to hinge pins which connect adjacent slats which comprise each of the strips. The end of each of the strips has a female connector in the form of a buckle receiving clasp. The guard further comprises a second component having a third flexible strip with two ends. The third flexible strip comprises two slats connected to one another in end to end relation. The unattached ends of the two slats include male members in the form of buckles to be inserted into the female clasps on one of the strips of the first component. The second component further comprises one tread member which is identical to the tread members of the first component. The tread member has a first end hingedly connected to the third strip and a second end comprising a hook to be attached to the third component. The third component comprises a latching member having a fourth flexible strip, the strip including three hinged slats, two outer hinged slats and one intermediate slat. One of the outer hinged slats has a male member in the form of a buckle positioned at its outer end and the other outer slat has a male member in the form of a buckle attached to an intermediate portion thereof. The latter or second outer slat also includes an aperture, so that when it is folded upon the intermediate slat in superposed relation, it will snap over an outwardly extending latching projection on the intermediate member. The intermediate slat further comprises an eyelet for receiving the end of the hook of the tread member on the second component. The guard is adapted to be securely positioned about a tire by inserting the male connectors on the second component into the female connectors on one of the strips of the first component. The male connector on the first outer slat of the latching member is inserted into one of the female connectors on the other of the strips comprising the first component and the male connector or buckle attached to an intermediate portion of the second outer slat is inserted into a female connecting member on the first component. The outer slat is then folded upon the intermediate slat on the latching member, the aperture securely engaging the projection on the intermediate slat in order to tighten the anti-skid guard about the vehicle tire.

BRIEF DESCRIPTION OF THE DRAWINGS

The above and other objects, features and advantages of the present invention will become more fully apparent to those of ordinary skill in the art to which this invention pertains, from the following detailed description, when considered in connection with the accompanying drawings, in which like reference characters designate like or corresponding parts throughout the several views, and wherein:

FIG. 1 is a plan view of a first component of the anti-skid tire guard formed in accordance with the present invention;

FIG. 2 is a perspective view of a second component of the anti-skid tire guard;

FIG. 3 is a perspective view of the third component of the anti-skid tire guard;

FIG. 4 is an enlarged cut-away plan view of the connection between adjacent slats and a tread member in the first element of FIG. 1;

FIG. 5 is an enlarged perspective view of a portion of one of the tread members of the first or second components;

DETAILED DESCRIPTION OF THE DRAWINGS

Figure 6:
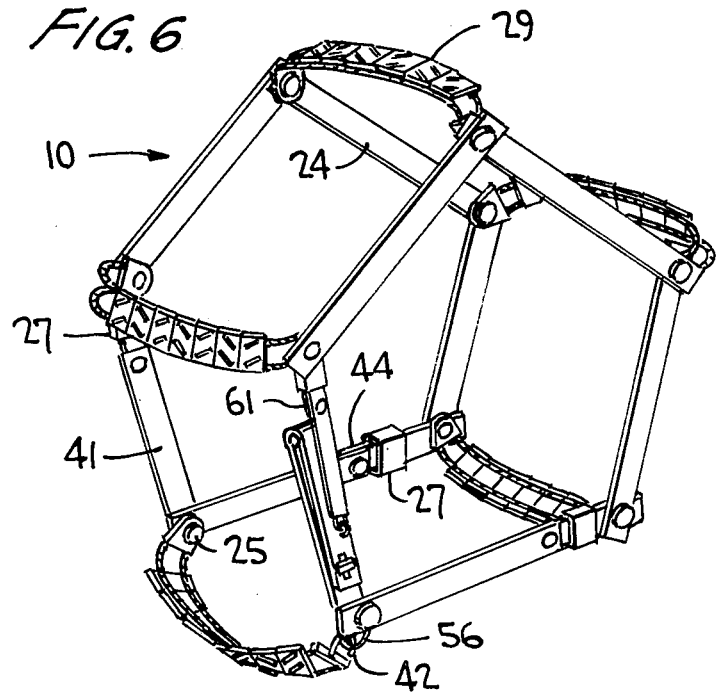
FIG. 6 is a perspective view of the anti-skid tire guard formed by the components shown in FIGS. 1, 2 and 3 when in its assembled condition.
Figure 7:
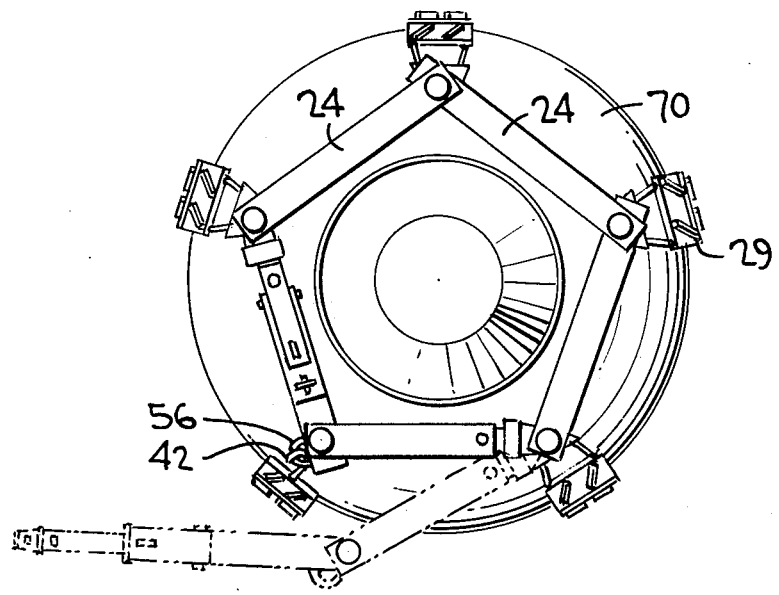
FIG. 7 is a plan view of the assembled anti-skid tire guard comprising the three components illustrated in FIGS. 1, 2 and 3, and is shown in dark lines in its assembled condition about a tire and in dashed lines in its released position.

Referring more specifically to the drawings, FIG. 1 illustrates first component 20 forming part of anti-skid tire guard 10, which is best illustrated in FIGS. 6 and 7. The member comprises two parallel strips 21 and 22. Each of the strips is comprised of a plurality of identical slats 24. In the embodiment illustrated in the drawings, anti-skid tire guard 10 has a pentagonal cross section; in this embodiment the first and second strips each comprise three identical slats 24 and also comprise 60% of the periphery of the tire guard. The adjacent slats are attached in end to end relation, the attached ends of adjacent slats being connected by generally vertical hinge pins 25 which extend generally transverse to the individual slats. At the ends of the two outer slats comprising each strip 21 are positioned female connectors 27. Each of these female connectors generally represent the receptacle in a seat belt fastening assembly, and each is connected to one end of the strip by a conventional fastener 26.

The two strips 21 are spaced apart by a plurality of tread members 29. Each of these tread members comprises a plurality of individual tread sections 31. Each section 31 comprises a hard blank formed of metal or plastic. The sections are arranged in generally abutting relationship in a direction transverse to the two parallel strips. The tread sections 31 have studs 32 projecting outwardly from the outer surfaces of the sections for enhancing road gripping in ice, rain, snow and other poor weather conditions. The sections are assembled together by a pair of wires or cables 34 which are inserted within projecting apertures 33 on the underside of each of the tread sections. The ends of the cables or wires are looped about opposed hinge pins 25 on sections 21 and 22 to provide a stable connection between the strips. Alternately, one wire or cable loop per tread member could be used. The manner in which the individual sections are connected is best illustrated in FIG. 5, and the connection of cables or wires 34 about hinge pin 25, together with the attachment of adjacent slats 24, is best illustrated in FIG. 4.

FIG. 2 best illustrates second member 40 of anti-skid tire guard 10. Member 40 forms the other 40% of one side of the tire guard. It comprises identical slats 41 attached in end to end relationship. Slats 41 are similar to slats 24 of the first member, and are attached by an identical hinge pin 25 extending generally vertical and transverse to the two slats. Slats 41, however, include male connector members 44 attached to their outer (free) ends. These male connector members preferably comprise buckles which are insertable into and easily releasable from buckle receiving clasps 27 on the ends of strips 21 and 22. Second member 40 also includes a tread member 29 generally identical to the tread members of the first member 20. This tread member is hinged to hinge pin 25 connecting slats 41 at one of its ends and is connected to an attaching hook 42 at its other end. A looped portion of attaching hook 42 is placed around one meeting end of cables 34. This member extends generally transverse to the slats 441 when the anti-skid tire guard is in its assembled condition, and can be pivoted about hinge pin 25 so that it overlies one of the slats 41 when the guard is either in its unassembled condition or is loosely positioned about a tire.

The third component of tire guard 10 is best illustrated in FIG. 3. Third component 50 comprises the other 40% of the other side of the pentagon (opposite from second member 40) when the tire guard is in its fully assembled position about a tire 70, as best illustrated in FIG. 7. Third member 50 comprises outer slats 52 and 54 and intermediate slat 53 positioned between the two outer slats. Slats 52 and 53 are connected to each other by transverse hinge pin 25, in a similar fashion to that described above; slats 53 and 54, however, are connected by a generally longitudinal hinge pin 55 such that slat 54 can be folded over slat 53 in superposed relation. Outer slat 52 has a male connector 44 in the form of a buckle attached at its outer end. This buckle is insertable into one of the female connector receptacles 27 on the parallel strip (either 21 or 22) to which second member 40 is not connected. Intermediate slat 53 includes an upwardly extending locking or latching projection 58 and outer slat 54 includes a locking latching aperture 59 designed to be engaged securely by latching member 58. In this fashion, when slats 53 and 54 are superposed, the latching or locking mechanism comprised by projection 58 and aperture 59 serves to maintain the two slats in folded relation. Intermediate slat 53 further includes an outwardly projecting loop 56 to which hook 42 of second member 40 is connected. This serves to space the second and third members in the transverse direction as are the two strips of the first member. This results essentially in two parallel strips surrounding a tire when assembled thereon, the strips being spaced apart by a plurality of transversely extending tread members having outwardly projecting studs. Outer slat 54 includes a loop 63 extending along its underside on an intermediate portion of the slat. A strap 61 is attached to this slat loop 63 via strap loop 62 positioned at one end of strap 61. The other, free end of strap 61 includes a male connector buckle member 44. This member is designed to be inserted into the remaining receptacle 27 on the same strip (either 21 or 22) to which male member 44 of slat 52 is attached.

FIG. 6 illustrates guard 10 in its assembled position, without a tire. First member 20, second member 40 and third member 50 are shown connected. Each tread member 29 is positioned transverse to strip 21 and 22 and the slats 41 of second member 40 and slats 52 through 54 of third member 50. The tread members enhance traction and gripping for a tire onto which they are placed. In its assembled condition, intermediate slat 53 and outer slat 54 of member 50 are folded in their superposed position such that latch projection 58 extends through aperture 59 and buckle 44 attached to strap 61 is inserted into one of the clasps 27.

FIG. 7 illustrates tire guard 10 positioned about tire 70; the solid lines indicate the guard in its tense, secure position about the tire and the dashed lines indicate the tire guard in its loosened position either prior to folding and superposition of slats 53 and 54 or after slats 53 and 54 have been separated prior to dismounting of the tire guards.

The simple three piece construction of the anti-skid tire guard 10 provides for easy mounting and dismounting by inexperienced users and does not require any tools or special positioning of the guard, vehicle, or tires onto which the guard is placed. Initially, first member 20 is positioned about an upper portion of a tire such that tread members 29 have their upper surfaces with studs 32 projecting outwardly. Second member 40 is then attached to one of the strips 21 or 22 comprising first member 20 by inserting male connectors 44 into respective female connectors 27 on the strip. Thereafter tread member 29 of second member 40 is extended in a position transverse to slats 41 such it extends over the outer surface of the tire parallel to slats 29 of first member 20. Third member 50 is then connected at one end by inserting male member 44 of slat 52 into one of the remaining free female connectors 27 on the unattached one of the strips of first member 20. Hook 42 of second tread member 29 is then hooked about loop 56 of intermediate slat 53. The guard is then tightened about tire 70 in secure position by inserting male member 44, which is attached to strap 61, into the remaining free female connector 27. Slat 54 is then folded over slat 53 in superposed relation such that aperture 59 engages projection 58; this engagement places the entire assembly under tension about tire 70. Strap 61 is flexible, as are the slats, and this enhances the entire tensioning function.

Removal of the device is simple and can be achieved without tools and irrespective of the particular position in which the tire or wheel is situated by releasing the four male connectors 44 from female connectors 27, e.g. in this instance by releasing four mating connectors by push buttons as in a conventional seat belt. In this fashion, the entire assembly can be removed by simple user manipulation. The locking/hatching assembly can be positioned atop, at the bottom, or alongside the tire and be equally easily removed in each position.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An anti-skid tire guard for a vehicle tire which is adapted to be quickly mounted upon and dismounted from the tire when said vehicle is positioned on the ground or similar support surface, said guard comprising:
   (a) a first component comprising two generally parallel flexible strips spaced apart by a plurality of tread members positioned in a direction generally transverse to said strips, each of said strips having two ends and connectors at said ends;
   (b) a second component comprising a third flexible strip having two ends, said ends comprising mating connectors adapted to be attached to the connectors on one of said two parallel strips, and a tread member having a first end attached to said third strip and a second end adapted to be connected to a latching member, said tread member adapted to extend transverse to said third flexible strip; and
   (c) a third component comprising a latching member having a fourth flexible strip, said fourth flexible strip having a plurality of hinged slats, two mating connectors adapted to be connected to the connectors on the other of said two parallel strips, means for retaining said second component tread member and means for retaining two of said hinged slats in superposed folded relation, whereby said three components are attached by connecting said mating connectors, said guard being securely positioned about said tire by folding said two hinged slats in superposed relation.

2. An anti-skid tire guard in accordance with claim 1 wherein each of said parallel strips comprises a plurality of slats attached end to end by generally vertically extending hinge pins.

3. An anti-skid tire guard in accordance with claim 2 wherein each of said parallel strips has two outer slats aand one intermediate slat, said strips having two outer ends and female attachment members secured to said outer ends.

4. An anti-skid tire guard in accordance with claim 3 wherein said female attachment members comprise buckle receiving clasps.

5. An anti-skid tire guard in accordance with claim 2 wherein each of said tread members comprises a plurality of hard blanks positioned side by side, said blanks having outer surfaces with rectangular studs projecting therefrom, said blanks being connected by at least one wire or cable which is attached to one hinge pin on each of said parallel strips, each of said blanks having at least one wire receiving aperture on its underside.

6. An anti-skid tire guard in accordance with claim 1 wherein said guard has a pentagonal cross section.

7. An anti-skid tire guard in accordance with claim 1 wherein said third step comprises two slats attached end to end, said mating connectors comprise buckles and said second end of said tread member comprises a hook adapted to be connected to an eyelet on said latching member.

8. An anti-skid tire guard in accordance with claim 7 wherein said latching member comprises two outer slats and an intermediate slat, one of said outer slats having a buckle at one end, said intermediate slat including said eyelet, and the other of said outer slats being connected to said intermediate slat by a generally longitudinal hinge and thereby adapted to be folded over said intermediate slat in superposed relation.

9. An anti-skid tire guard in accordance with claim 8 wherein said other outer slat has a locking aperture which is adapted to be engaged by a locking projection on said intermediate member when said slats are superposed, and a buckle is attached to an intermediate portion of said other outer slat.

10. An anti-skid tire guard in accordance with claim 1 wherein said treads are equally spaced about said tire when said guard is placed about said tire.

11. An anti-skid tire guard for a vehicle tire which is adapted to be mounted upon and demounted from said tire without raising a vehicle wheel upon which the tire is positioned, said guard comprising:
   (a) a first component comprising two generally parallel flexible strips spaced apart by a plurality of tread members positioned in a direction generally transverse to said strips, each of said strips comprising two outer slats and an intermediate slat, said strips having two outer ends with female attachment members comprising buckle receiving clasps secured to the outer ends, each of said tread members comprising a plurality of hard blanks positioned side by side and having outer surfaces with rectangular studs projecting therefrom, the blanks being connected by at least one wire or cable which is attached to a respective hinge pin connecting slats on each of said parallel strips;
   (b) a second component comprising a third flexible strip having two ends, said third strip including two slats attached end to end and having male connectors in the form of buckles adapted to be attached to said buckle receiving clasps on one of said parallel strips of said first component, a tread member similar to each of the tread members of said first component, said tread member having a first end hingedly connected to said third strip and a second end comprising a hook adapted to be connected to an eyelet on a latching member; and
   (c) a third component comprising a latching member having a fourth flexible strip, said strip having two outer slats and an intermediate slat, one of said outer slats having a buckle at one end adapted to be connected to one of said buckle receiving clasps on the other of said spaced parallel flexible strips, said intermediate slat including said eyelet and an upwardly projecting locking member, the other of said outer slats foldably connected to said third component intermediate slat by a generally longitudinal hinge pin, said other outer slat comprising a buckle on an intermediate portion thereof and a locking aperture adapted to be connected to said locking projection when said latching member outer slat is folded in superposed relation over said latching member intermediate slat.

* * * * *

UNITED STATES PATENT AND TRADEMARK OFFICE
CERTIFICATE OF CORRECTION

PATENT NO. : 4,323,103

DATED : April 6, 1982

INVENTOR(S) : Yoobong KIM

It is certified that error appears in the above—identified patent and that said Letters Patent is hereby corrected as shown below:

```
In the Abstract, line 10, "by" should read -- of --.
At Column 1, line 15, "Discusion" should be --Discussion--.
Column 1, line 17, "vehicles" should be --vehicle--.
Column 2, line 25, "assembly" should be --assemble--.
Column 2, line 39, after "vehicle" insert --tire--.
Column 2, line 46, "tires" should be --tire--.
Column 2, line 51, "unit" should be --units--.
Column 3, line 39, "place" should be --placed--.
Column 3, line 60, "and" should be --end--.
Column 5, line 4, "represent" should be --represents--.
Column 5, line 5, "receptable" should be --receptacle--.
Column 5, line 30, "quard" should be --guard--.
Column 5, line 47, "441" should be --41--.
Column 6, line 55, after "such" insert --that--.
Column 8, line 4, "step" should be --strip--.
```

Signed and Sealed this

Twenty-second Day of June 1982

[SEAL]

Attest:

GERALD J. MOSSINGHOFF

*Attesting Officer*     *Commissioner of Patents and Trademarks*